US010951158B2

(12) United States Patent
Chang

(10) Patent No.: US 10,951,158 B2
(45) Date of Patent: Mar. 16, 2021

(54) ADJUSTMENT MECHANISM FOR SUPPORT OF SOLAR PANEL

(71) Applicant: San-He Chang, Taichung (TW)

(72) Inventor: San-He Chang, Taichung (TW)

(73) Assignee: STRONGEN CO., LTD., Taichung (TW)

( * ) Notice: Subject to any disclaimer, the term of this patent is extended or adjusted under 35 U.S.C. 154(b) by 37 days.

(21) Appl. No.: 16/214,252

(22) Filed: Dec. 10, 2018

(65) Prior Publication Data

US 2019/0372510 A1 Dec. 5, 2019

(30) Foreign Application Priority Data

May 29, 2018 (TW) .................................. 107207044

(51) Int. Cl.
*F24S 25/60* (2018.01)
*H02S 20/30* (2014.01)

(52) U.S. Cl.
CPC .............. *H02S 20/30* (2014.12); *F24S 25/60* (2018.05); *F24S 2025/6006* (2018.05)

(58) Field of Classification Search
USPC ......... 248/346.01, 346.05, 346.06, 523, 524, 248/527, 535, 224.8; 52/296, 297, 298, 52/704, 708
See application file for complete search history.

(56) References Cited

U.S. PATENT DOCUMENTS

| | | | | |
|---|---|---|---|---|
| 4,644,713 A | * | 2/1987 | Lehman | E04H 12/2215 52/165 |
| 5,412,913 A | * | 5/1995 | Daniels | E04B 1/24 212/177 |
| 5,481,938 A | * | 1/1996 | Stuedemann | B62D 1/184 280/775 |
| 5,568,909 A | * | 10/1996 | Timko | E04H 12/2261 248/519 |
| 5,801,920 A | * | 9/1998 | Lee | G06F 1/184 248/220.31 |
| 6,240,682 B1 | * | 6/2001 | James | E04B 7/024 52/90.2 |
| 10,330,347 B2 | * | 6/2019 | Yang | H02S 20/23 |

* cited by examiner

*Primary Examiner* — Alfred J Wujciak

(57) ABSTRACT

An adjustment mechanism for adjusting height of a support including a through hole and configured to mount a solar panel thereon is provided with a base including an upward extending side plate on a top, a vertical, elongated slot through the side plate, and holes upward oriented, equally spaced apart from the slot in which a lower portion of the support is engaged with each side plate; an adjustment plate including at least one peg on an inner surface and a central opening in which each peg is configured to fit into one hole; and a threaded fastener driven through the central opening, the slot and the through hole to adjustably fasten the adjustment plate, the side plate and the support together.

10 Claims, 10 Drawing Sheets

ADJUSTMENT MECHANISM FOR SUPPORT OF SOLAR PANEL

BACKGROUND OF THE INVENTION

1. Field of the Invention

The invention relates to height adjustment mechanisms and more particularly to a mechanism for adjusting height of a support so that height of a solar panel mounted on the support can be adjusted by the mechanism.

2. Description of Related Art

A conventional support 50 of a solar panel (no shown) is shown in FIG. 10. The support 50 includes two upward extending elongated slots 52 on two sides respectively. A base 60 includes two parallel upward extending side plates 61 on a top. The side plate 61 includes a vertical, elongated slot 62 through an intermediate portion. After placing a lower portion of the support 50 in a space between the side plates 61, a threaded fastener 70 is driven through the slots 62, 52 to adjustably secure the support 50 to the base 60.

However, the slots 62, 52 are poor in terms of positioning purpose. The fastening of the support 50 and the base 60 can be compromised due to thermal expansion or contraction, or the blowing of strong winds. As a result, the solar panels mounted on the support 50 may be displaced or even fall.

Thus, the need for improvement still exists.

SUMMARY OF THE INVENTION

It is therefore one object of the invention to provide a mechanism for adjusting height of a support including a through hole and configured to mount a solar panel thereon, comprising a base including at least one upward extending side plate on a top, a vertical, elongated slot through each side plate, and a plurality of holes upward oriented, equally spaced apart from the slot of each side plate wherein a lower portion of the support is engaged with each side plate; an adjustment plate including at least one peg on an inner surface and a central opening wherein each peg is configured to fit into one of the holes; and a threaded fastener driven through the central opening of the adjustment plate, the slot and the through hole to adjustably fasten the adjustment plate, the side plate and the support together; wherein bore of each of the central opening and the through hole is greater than a cross-section of the threaded fastener so that the threaded fastener is configured to drive through both the central opening and the through hole.

The invention has the following advantages and benefits in comparison with the conventional art: the fastening of the support and the base is reliable without being loosened or displaced due to thermal expansion or contraction, or the blowing of strong winds. Further, the fitting of the pegs in the holes greatly increases the reliability of positioning, thereby ensuring a subsequent threaded fastening by driving the threaded fastener through the adjustment plate, the side plate, and the support.

The above and other objects, features and advantages of the invention will become apparent from the following detailed description taken with the accompanying drawings.

BRIEF DESCRIPTION OF THE DRAWINGS

FIG. 2A is a detailed view of the area in circle A of FIG. 2 but viewing from an inner surface of the adjustment plate;

DETAILED DESCRIPTION OF THE INVENTION

Figures 1, 1A:
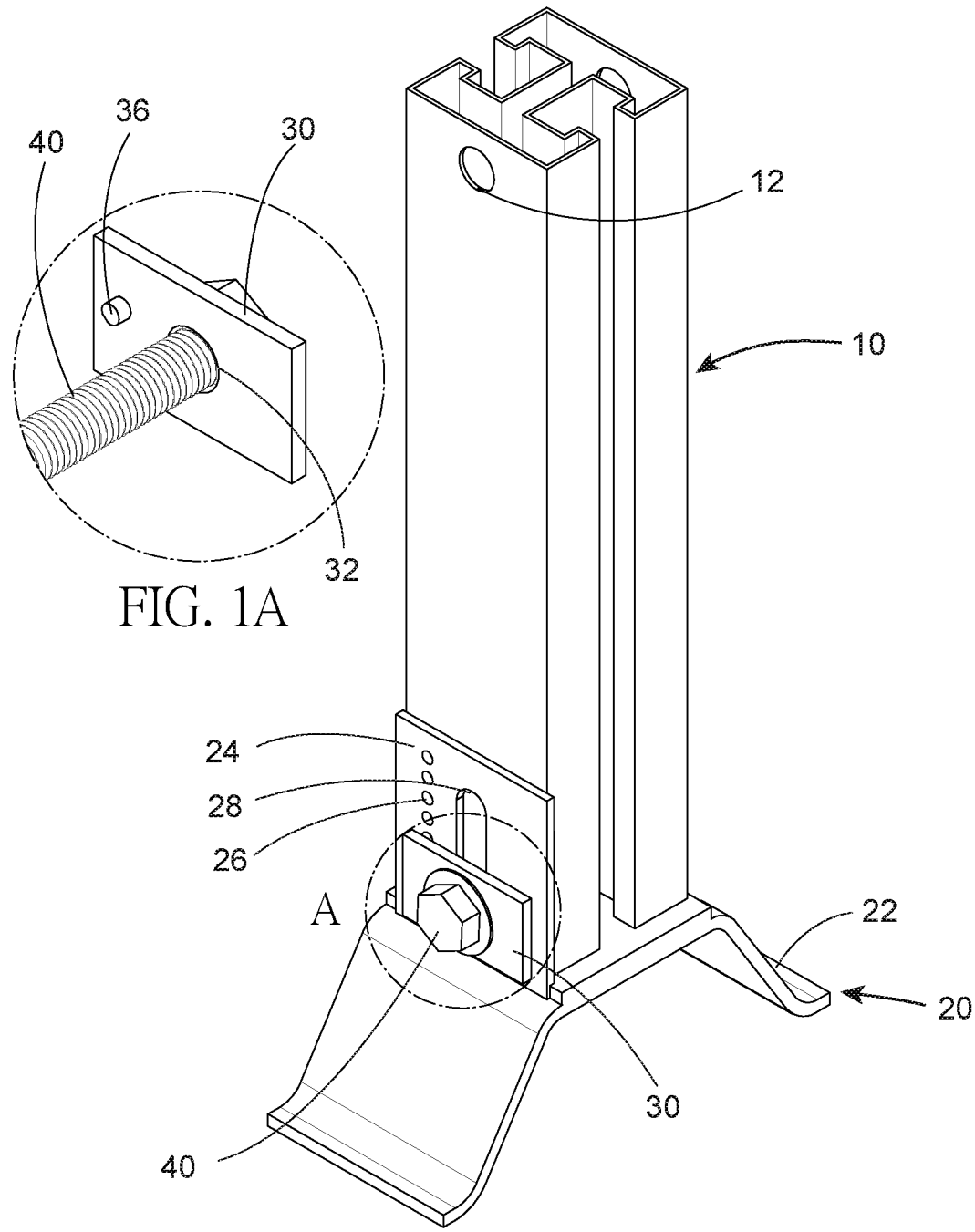
FIG. 1 is a perspective view of an adjustment mechanism for a support of a solar panel according to a first preferred embodiment of the invention.
FIG. 1A is a detailed view of the area in circle A of FIG. 1 but viewing from an inner surface of the adjustment plate.

Referring to FIGS. 1 and 1A, an adjustment mechanism in accordance with a first preferred embodiment of the invention is shown. The adjustment mechanism is used to adjust height of a solar panel (not shown). The adjustment mechanism comprises a support 10 with the solar panel mounted thereon, a base 20, an adjustment plate 30 and a threaded fastener 40 as discussed in detail below.

The base 20 includes a rectangular, upward extending side plate 24, an upward extending elongated slot 28 through an intermediate portion of the side plate 24, and a plurality of holes 26 upward oriented, equally spaced apart between the slot 28 and a rear end of the side plate 24. As shown in FIG. 1A, a peg 36 is formed on an inner surface of the adjustment plate 30 and adapted to fit into one of the holes 26 for adjustment purpose. Thereafter, the threaded fastener 40 is driven through a central opening 32 of the adjustment plate 30, the slot 28, a lower one of two through holes 12 and one side of the support 10 to fasten the adjustment plate 30, the side plate 24 (i.e., the base 20) and the support 10 together.

Figure 2:
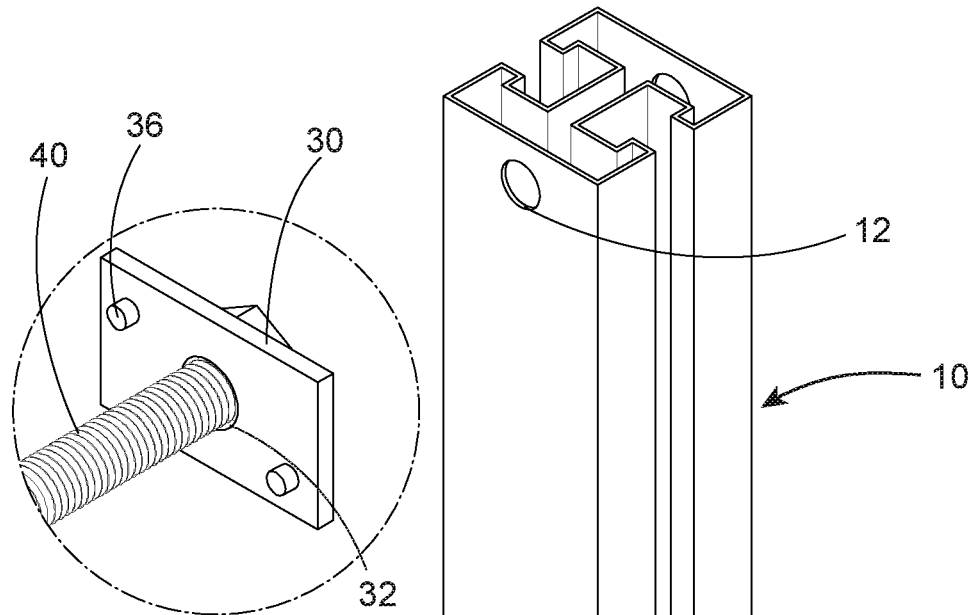
FIG. 2 is a perspective view of an adjustment mechanism for a support of a solar panel according to a second preferred embodiment of the invention.
Figure 2:
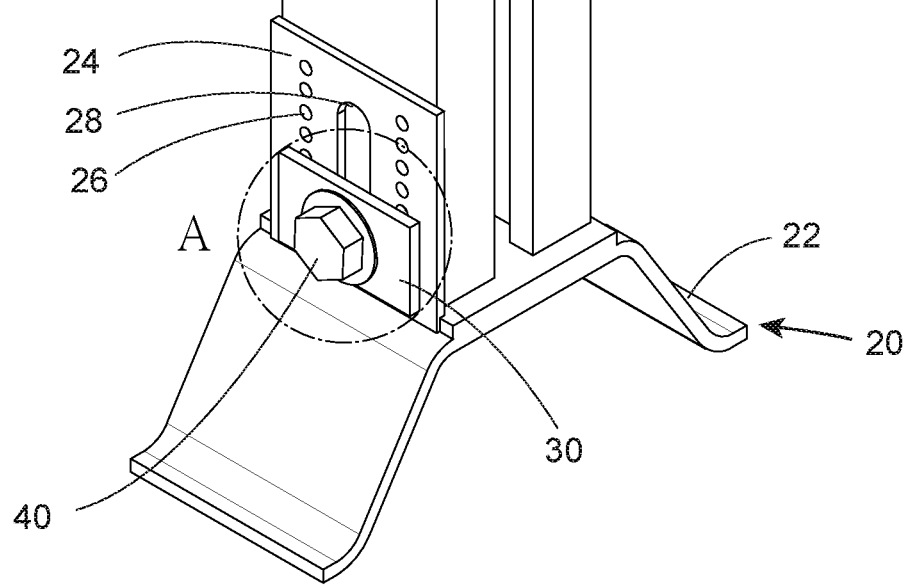
Figure 3:
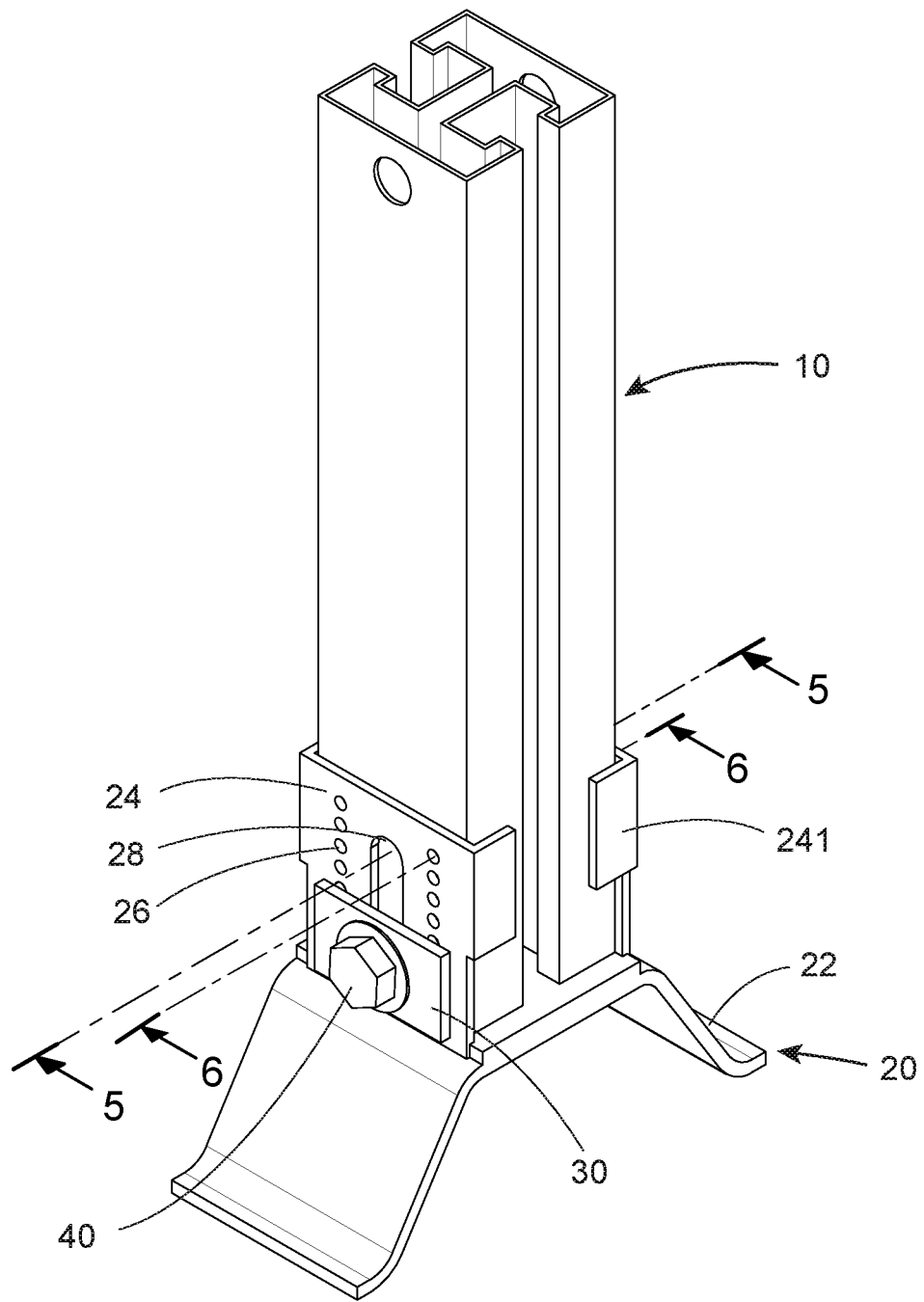
FIG. 3 is a perspective view of an adjustment mechanism for a support of a solar panel according to a third preferred embodiment of the invention.

Referring to FIGS. 2 and 2A, an adjustment mechanism in accordance with a second preferred embodiment of the invention is shown. The adjustment mechanism is used to adjust height of a solar panel (not shown). The adjustment mechanism comprises a support 10 with the solar panel mounted thereon, a base 20, an adjustment plate 30 and a threaded fastener 40 as discussed in detail below.

The base 20 includes a rectangular, upward extending side plate 24, an upward extending elongated slot 28 through an intermediate portion of the side plate 24, and two sets of a plurality of holes 26 with each set of the holes 26 upward oriented, equally spaced apart between the slot 28 and a rear end (or a front end) of the side plate 24. As shown in FIG. 2A, two end pegs 36 are formed on an inner surface of the adjustment plate 30 and adapted to fit into two opposite ones of the holes 26 respectively for adjustment purpose. Thereafter, the threaded fastener 40 is driven through a central opening 32 of the adjustment plate 30, the slot 28, a lower one of two through holes 12 and one side of the support 10 to fasten the adjustment plate 30, the side plate 24 (i.e., the base 20) and the support 10 together.

Referring to FIGS. 3 to 7, an adjustment mechanism in accordance with a third preferred embodiment of the invention is shown. The adjustment mechanism is used to adjust height of a solar panel (not shown). The adjustment mechanism comprises a support 10 with the solar panel mounted thereon, a base 20, two adjustment plates 30 and a threaded fastener 40 as discussed in detail below.

The support 10 includes two sets of two through holes 12 through both sides respectively. The base 20 includes two rectangular, upward extending side plates 24, an upward extending elongated slot 28 through an intermediate portion of either side plate 24, and two sets of a plurality of holes 26 on either side in which each set of the holes 26 are upward oriented, equally spaced apart between the slot 28 and a rear end (or a front end) of the side plate 24.

The base 20 further comprises two inclined members 22 on both sides respectively, the inclined members 22 adapted to engage with a corrugated plate (not shown). Further, one inclined member 22 and one side plate 24 having the holes 26 are at one side of the base 20, and the other inclined member 22 and the other side plate 24 having the holes 26 are at the other side of the base 20.

Each side plate 24 includes two limit members 241 on front and rear ends respectively. The limit member 241 is 90-degree bent inward about the side plate 24. Thus, a lower portion of the support 10 is partially surrounded by the side plates 24. Further, stability of the support 10 in space defined by the side plates 24 is greatly increased due to the engagement of the limit members 241 with the support 10.

Figure 4:
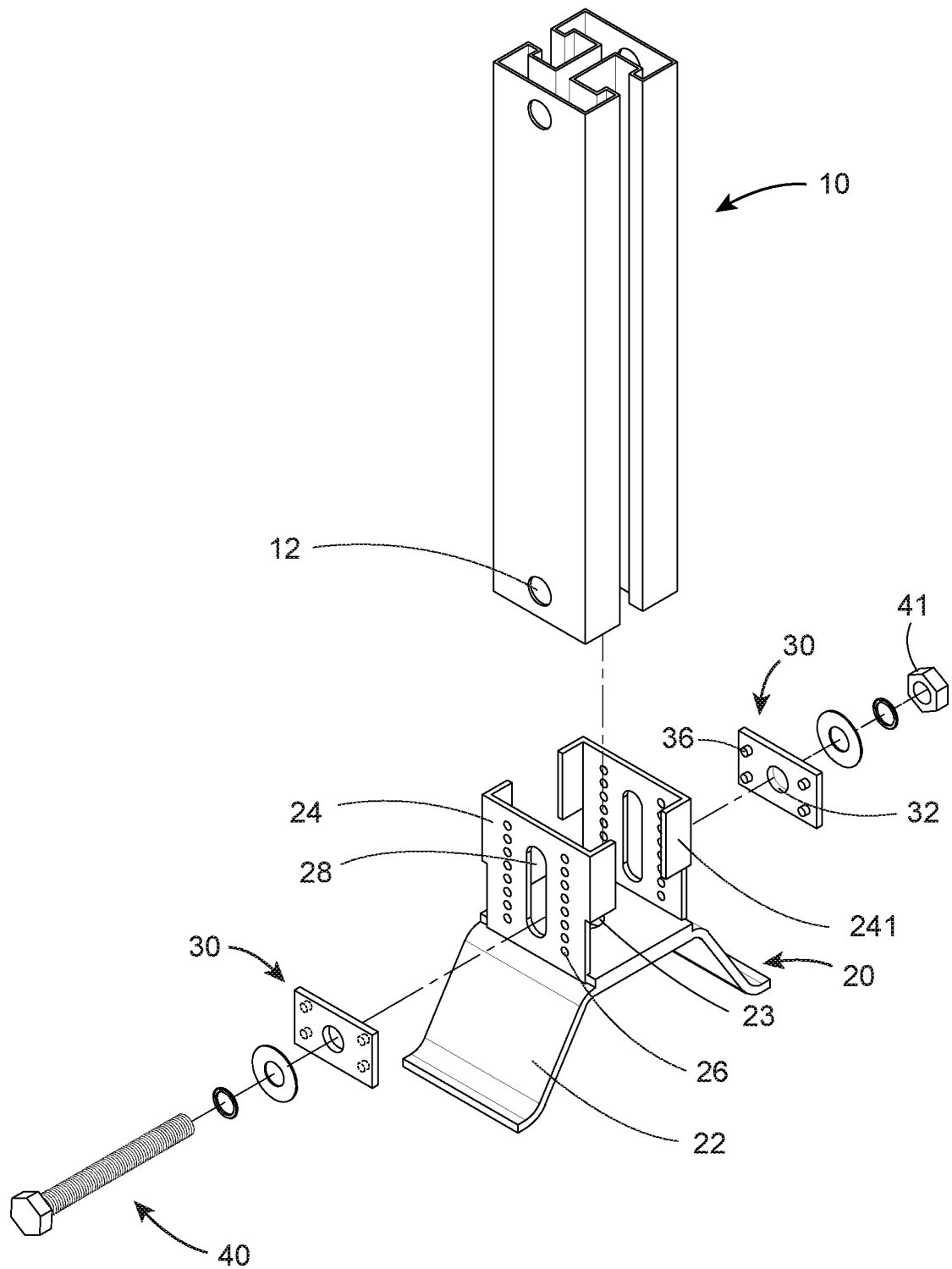
FIG. 4 is an exploded view of FIG. 3.

As shown in FIG. 4, four pegs 36 are formed on four corners of an inner surface of the adjustment plate 30 and adapted to fit into the holes 26 of either side plate 24 respectively for adjustment purpose. Thereafter, the threaded fastener 40 is driven through a central opening 32 of one adjustment plate 30, the slot 28 of one side plate 24, the lower through hole 12 of one side of the support 10, the lower through hole 12 of the other side of the support 10, the slot 28 of the other side plate 24, the central opening 32 of the other adjustment plate 30, and a nut 41 to fasten the adjustment plates 30, the side plates 24 (i.e., the base 20) and the support 10 together.

Figure 5:
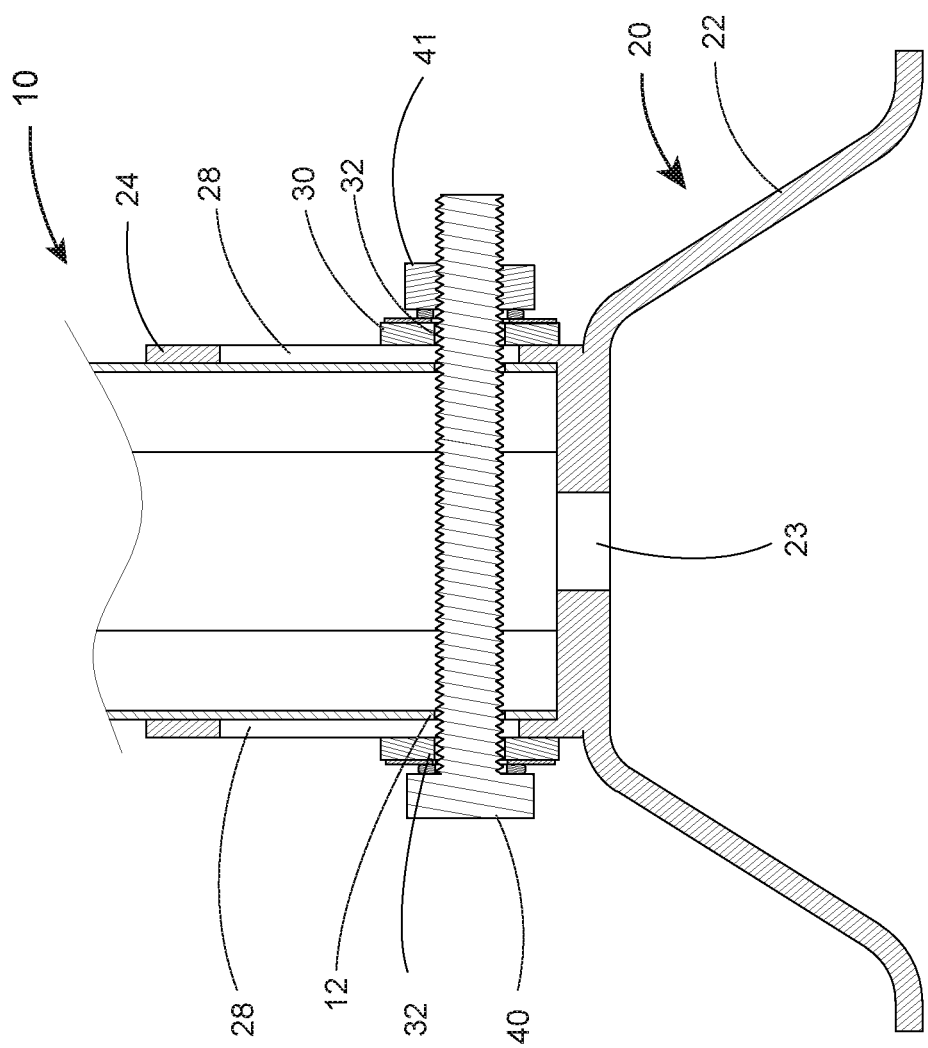
FIG. 5 is a sectional view taken along line 5-5 of FIG. 3.

As shown in FIG. 5, it is longitudinal sectional view showing the threaded fastener 40 driven through the adjustment plates 30, the side plates 24 (i.e., the base 20) and the support 10 together. The bore of each of the central opening 32 and the through hole 12 is slightly greater than a cross-section of the threaded fastener 40 so that the threaded fastener 40 can be driven through the central opening 32 of one adjustment plate 30, the slot 28 of one side plate 24, the lower through hole 12 of one side of the support 10, the lower through hole 12 of the other side of the support 10, the slot 28 of the other side plate 24, the central opening 32 of the other adjustment plate 30, and a nut 41 to fasten the adjustment plates 30, the side plates 24 (i.e., the base 20) and the support 10 together. Also, the fastening is reliable and stable.

There is further provided a hole 23 through a top of the base 20. A fastener (not shown) can be driven through the hole 23 to secure the base 20 to a corrugated plate (not shown).

Figure 6:
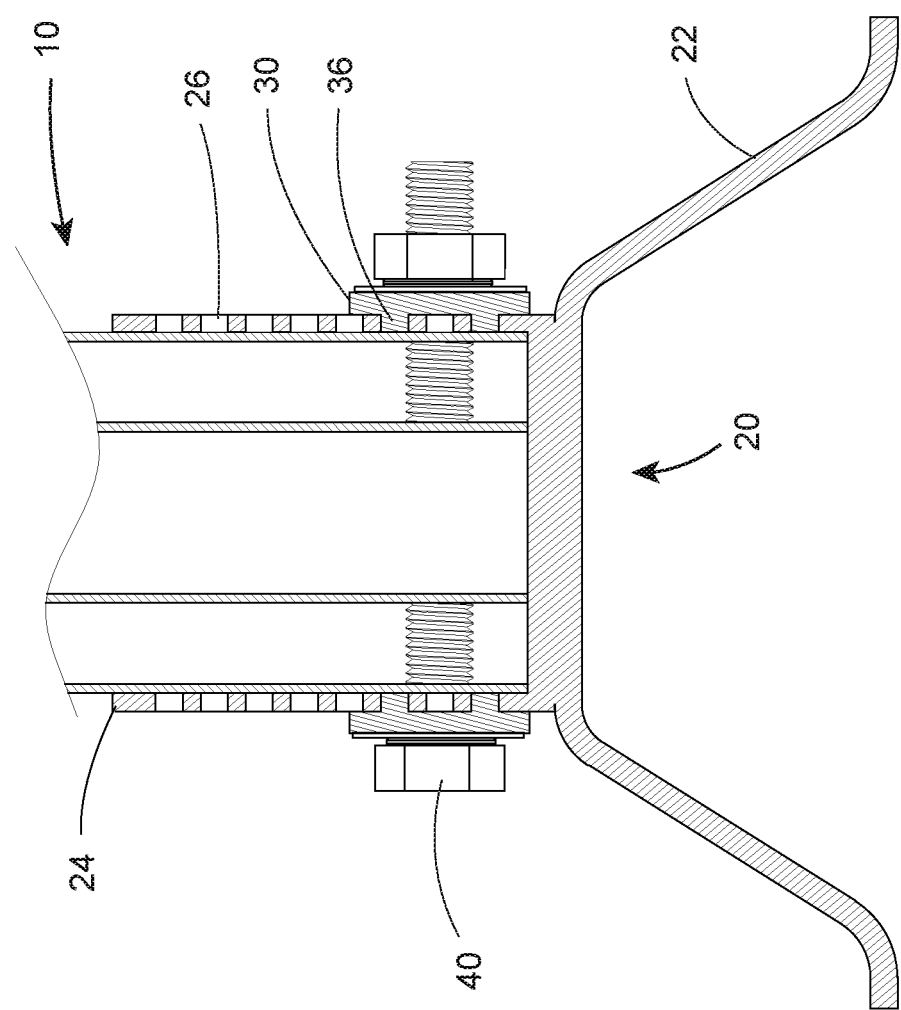
FIG. 6 is a sectional view taken along line 6-6 of FIG. 3.

As shown in FIG. 6 in conjunction with FIG. 5, it is a sectional view showing two adjustment plates 30 are secured to two side plates 24 respectively. The central openings 32 can be aligned with the through holes 12 by vertically moving the support 10. Next, the pegs 36 on the inner surface of the adjustment plate 30 are fitted into the holes 26 for positioning purpose. In the embodiment, a distance between two adjacent pegs 36 of the same column is equal to that between one hole 26 and the second nearest hole 26 therebelow. That is, in an assembly, one peg 36 fits into the corresponding hole 26 and the peg 36 below one peg 36 fits into the second nearest hole 26 below the corresponding hole 26. As a result, the adjustment mechanism is structurally strong and reliable.

Figure 7:
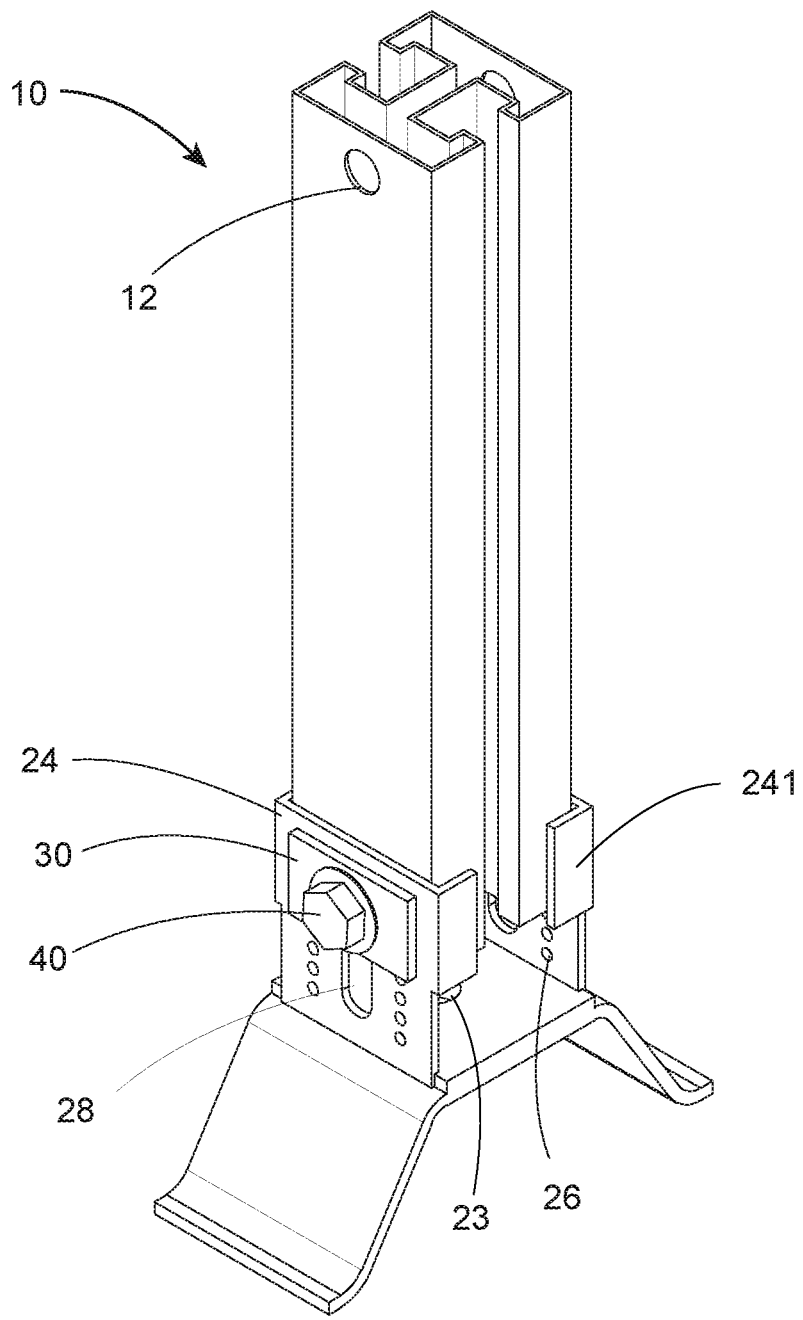
FIG. 7 is a view similar to FIG. 3 showing the support being raised for adjustment and fastened.

As shown in FIG. 7 in conjunction with FIG. 4, it is an embodiment showing the support 10 adjustably mounted on the base 20. The through hole 12 is allowed to move in a range aligned with the slot 28. After adjusting the support 10 relative to the base 20, the adjustment plates 30 move upward along the side plates 24 so as to align the through holes 12 with the central openings 32. As such, the adjustment plates 30 and the side plates 24 are positioned. Finally, the threaded fastener 40 is driven through the central opening 32 of one adjustment plate 30, the slot 28 of one side plate 24, the lower through hole 12 of one side of the support 10, the lower through hole 12 of the other side of the support 10, the slot 28 of the other side plate 24, the central opening 32 of the other adjustment plate 30, and the nut 41 to fasten the adjustment plates 30, the side plates 24 (i.e., the base 20) and the support 10 together. Also, the fastening is reliable and stable.

Figure 8:
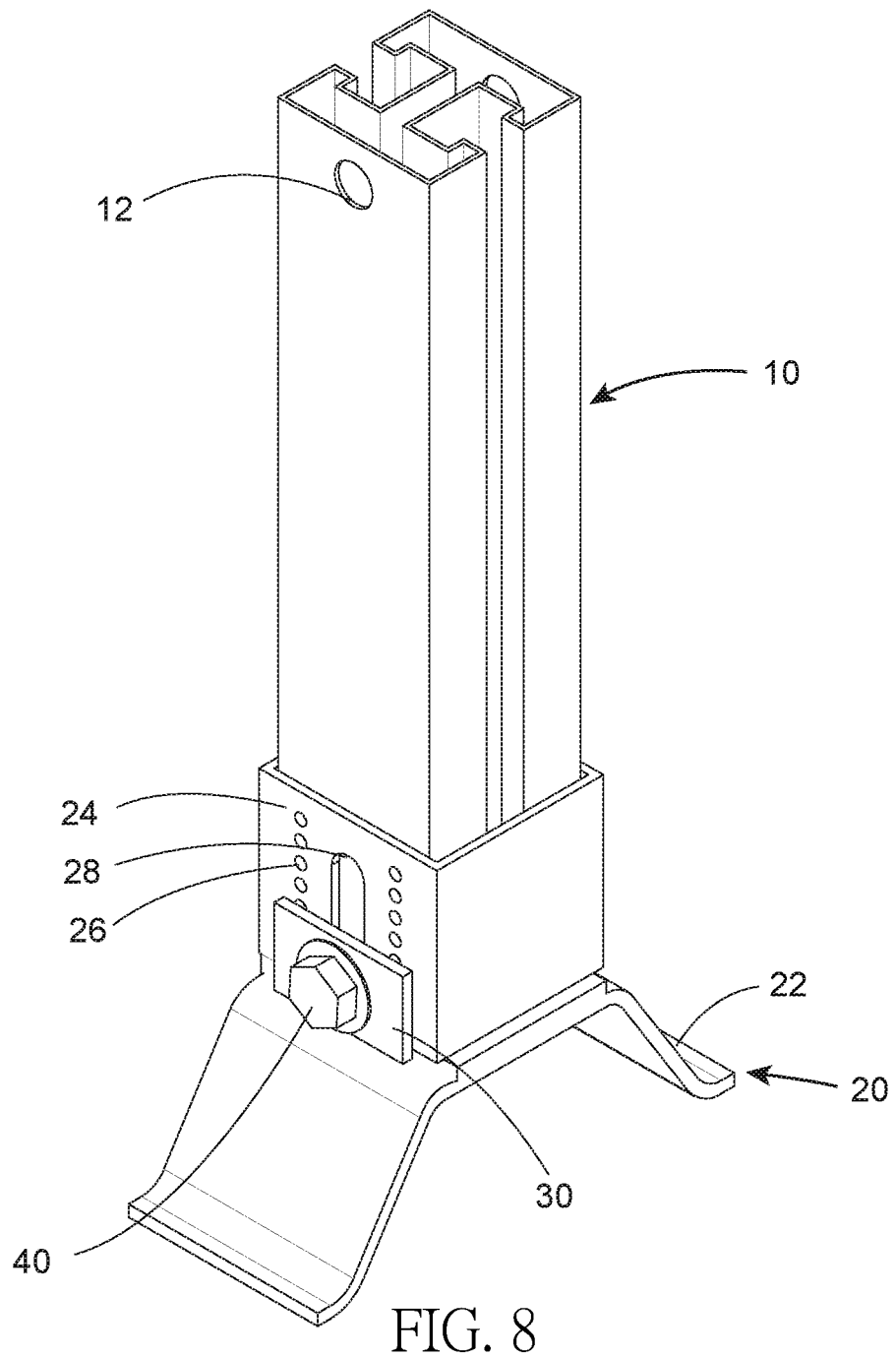
FIG. 8 is a perspective view of an adjustment mechanism for a support of a solar panel according to a fourth preferred embodiment of the invention.

Referring to FIG. 8, an adjustment mechanism in accordance with a fourth preferred embodiment of the invention is shown. The adjustment mechanism is used to adjust height of a solar panel (not shown). The adjustment mechanism comprises a support 10 with the solar panel mounted thereon, a base 20, an adjustment plate 30 and a threaded fastener 40 as discussed in detail below.

The base 20 includes four rectangular, upward extending side plates 24 formed integrally to have a rectangular cross-section, an upward extending elongated slot 28 through an intermediate portion of each of the two opposite side plates 24, two sets of a plurality of holes 26 formed on each of the two opposite plates 24 with each set of the holes 26 upward oriented, equally spaced apart between the slot 28 and a rear end (or a front end) of the side plate 24, and two inclined members 22 on both sides of the base 20 respectively, the inclined members 22 adapted to engage with a corrugated plate (not shown). Further, one inclined member 22 and one side plate 24 having the holes 26 are at one side of the base 20, and the other inclined member 22 and the other side plate 24 having the holes 26 are at the other side of the base 20. The threaded fastener 40 is driven through one adjustment plate 30, the slot 28 of one side plate 24, through holes 12 of the support 10, the slot 28 of the other side plate 24, the other adjustment plate 30, and a nut (not shown) to fasten the adjustment plates 30, the side plates 24 (i.e., the base 20) and the support 10 together.

The adjustment plates 30 are adapted to move upward or downward relative to the support 10 for adjustment and secure to the holes 26. Further, the threaded fastener 40 is used to fasten the adjustment plates 30, the base 20 and the support 10 together. The four side plates 24 arranged as a hollow parallelepiped in the fourth preferred embodiment further enhance fastening of the base 20.

Figure 9:
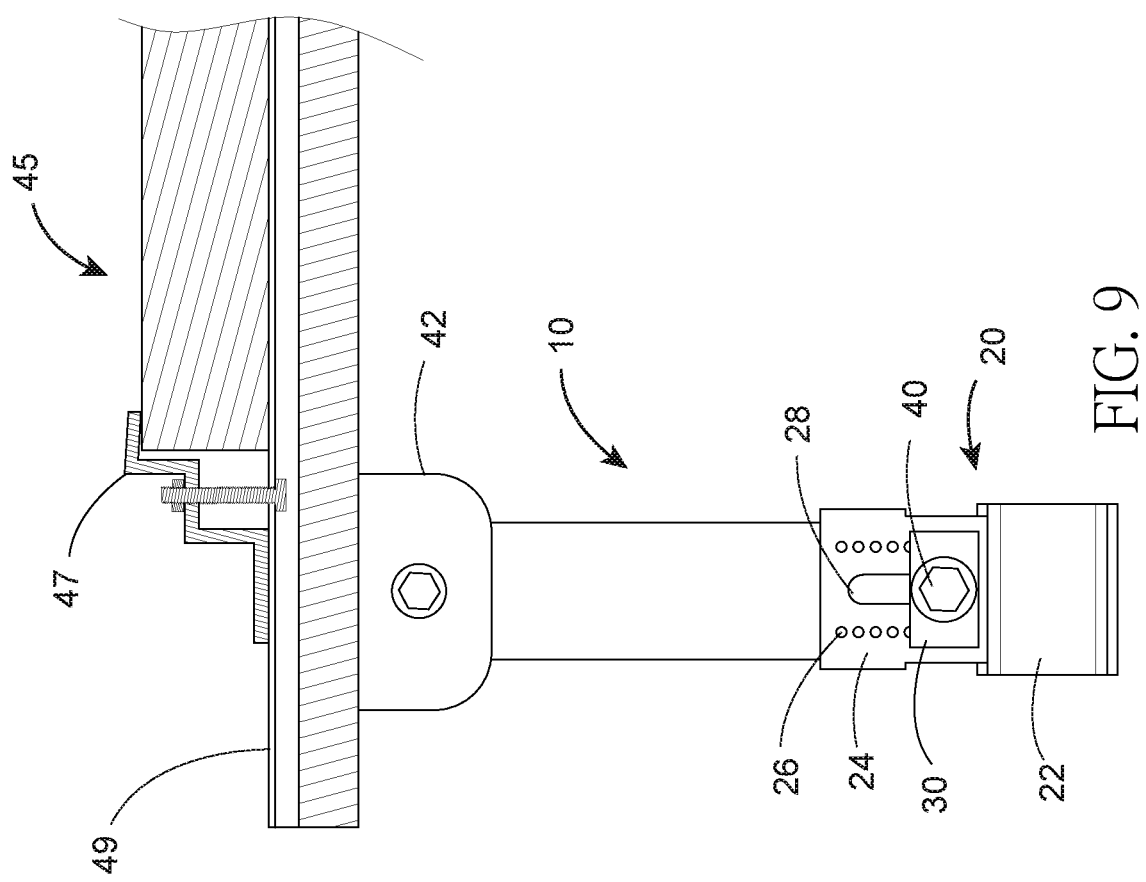
FIG. 9 is a side view schematically showing a solar panel mounted on the support.
Figure 10:
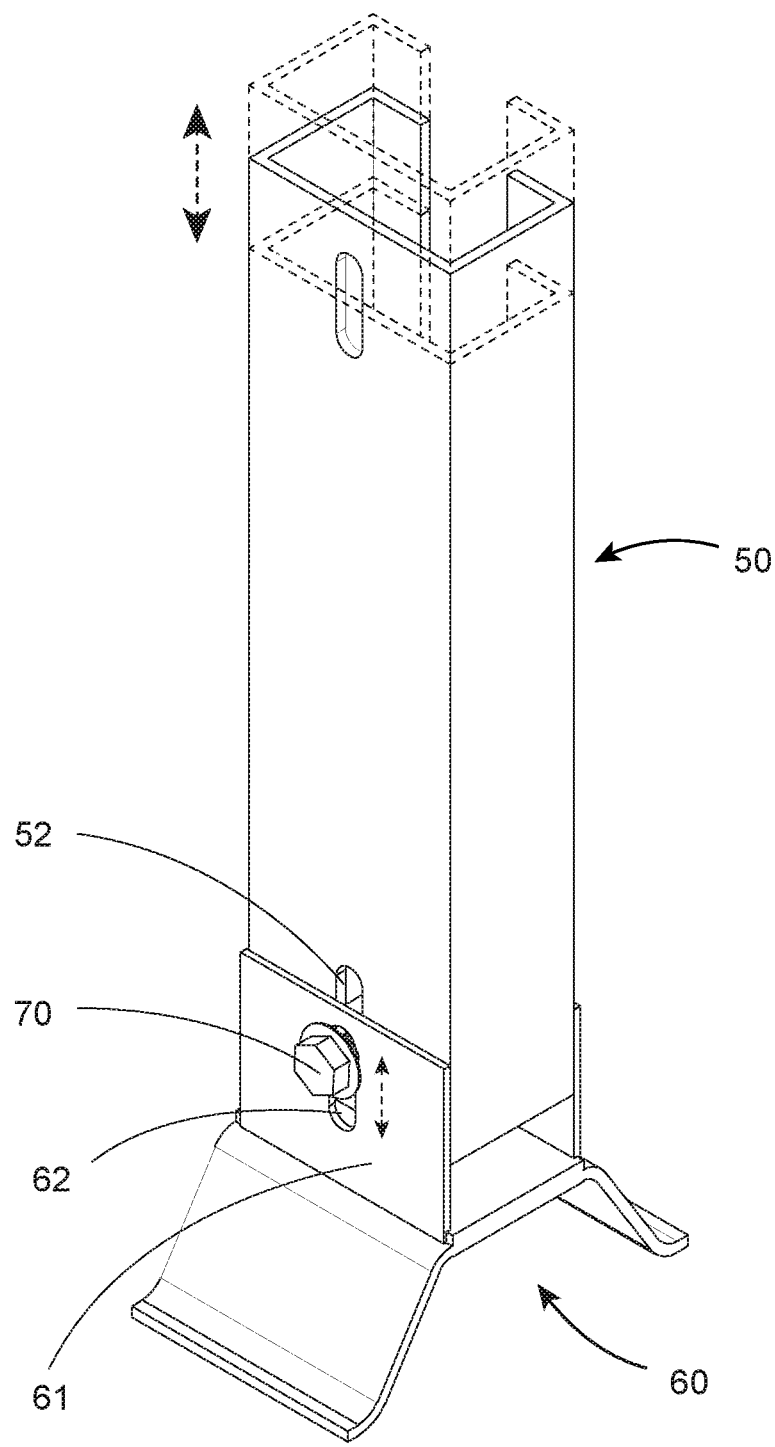
FIG. 10 is a perspective view of a conventional support of a solar panel with its height adjustment being shown.

Referring to FIG. 9, it is an embodiment showing a solar panel 45 mounted on the support 10. In detail, after mounting the support 10 on the base 20, the adjustment plate 30 is adapted to move upward or downward relative to the support 10 for adjustment and secure to the side plate 24. Further, the threaded fastener 40 is used to fasten the adjustment plate 30, the base 20 and the support 10 together. Furthermore, a bracket 42 is mounted on the support 10. In addition, a beam 49 is mounted on the bracket 42. Additionally, a solar panel 45 is mounted on the beam 49 by securing a pressing plate 47 to both the solar panel 45 and the beam 49. As a result, the solar panel 45 is installed.

While the invention has been described in terms of preferred embodiments, those skilled in the art will recognize that the invention can be practiced with modifications within the spirit and scope of the appended claims.

What is claimed is:

1. A mechanism for adjusting a height of a support configured to mount a solar panel thereon, comprising:
   a support including two sets of two through holes;
   a base including at least two upward extending side plates on a top of the base, a vertical, elongated slot through each at least two upward extending side plates, and a plurality of holes upward oriented, equally spaced apart from the elongated slot of each at least two upward extending side plates wherein a lower portion of the support is engaged with each at least two upward extending side plates;
   an adjustment plate including at least one peg on an inner surface and a central opening wherein each at least one peg is configured to fit into one of the plurality of holes; and
   a threaded fastener driven through the central opening of the adjustment plate, the elongated slot and at least one of the through holes of the two sets of two through holes of the support to adjustably fasten the adjustment plate, the at least two upward extending side plates and the support together;
   wherein a bore of each of the central opening of the adjustment plate and the at least one of the through holes of the two sets of two through holes is greater than a cross-section of the threaded fastener so that the threaded fastener is configured to drive through both the central opening and the through hole.

2. The mechanism of claim 1, wherein the plurality of holes are formed on two sides of the slot respectively with the slot disposed equidistantly therebetween.

3. The mechanism of claim 1, wherein the number of the at least one peg is more than one and the pegs are symmetrically or diagonally disposed on the inner surface of the adjustment plate relative to the central opening.

4. The mechanism of claim 3, wherein a distance between two vertically disposed adjacent pegs is twice that between two vertically disposed adjacent holes.

5. The mechanism of claim 1, wherein the number of the at least two upward extending side plates is two and the upward extending side plates are opposite with the support disposed therebetween.

6. The mechanism of claim 1, wherein the number of the at least two upward extending side plates is four, the upward extending side plates are formed integrally, and the support is surrounded by the upward extending side plates.

7. The mechanism of claim 1, wherein the base further comprises a hole member through a top, and two inclined members on both sides of the base respectively; and wherein one inclined member and one of the at least two upward extending side plates having the holes are at one side of the base, and the other inclined member and the other of the at least two upward extending side plates having the holes are at the other side of the base.

8. The mechanism of claim 1, wherein each of the at least two upward extending side plates includes two limit members on front and rear ends respectively, the limit members engaging the support.

9. The mechanism of claim 1, wherein the central opening aligns with the through hole.

10. The mechanism of claim 1, further comprising a bracket mounted on the support, and a beam mounted on the bracket.

* * * * *